US012094351B2

(12) United States Patent
Gurusamy et al.

(10) Patent No.: US 12,094,351 B2
(45) Date of Patent: Sep. 17, 2024

(54) SYSTEMS AND METHODS FOR PROVIDING OBSTACLE INFORMATION TO AIRCRAFT OPERATOR DISPLAYS

(71) Applicant: Honeywell International Inc., Charlotte, NC (US)

(72) Inventors: Saravanakumar Gurusamy, Tamil Nadu (IN); Pavan Kumar Yardoni Desai, Tamil Nadu (IN)

(73) Assignee: Honeywell International Inc., Charlotte, NC (US)

( * ) Notice: Subject to any disclaimer, the term of this patent is extended or adjusted under 35 U.S.C. 154(b) by 153 days.

(21) Appl. No.: 17/485,694

(22) Filed: Sep. 27, 2021

(65) Prior Publication Data
US 2023/0042820 A1    Feb. 9, 2023

(30) Foreign Application Priority Data

Aug. 3, 2021  (IN) .............................. 202111034896

(51) Int. Cl.
*G08G 5/00* (2006.01)
*G06F 16/29* (2019.01)
*G08G 5/04* (2006.01)

(52) U.S. Cl.
CPC .......... *G08G 5/0086* (2013.01); *G06F 16/29* (2019.01); *G08G 5/0026* (2013.01); *G08G 5/0069* (2013.01); *G08G 5/045* (2013.01)

(58) Field of Classification Search
CPC .. G08G 5/0086; G08G 5/0026; G08G 5/0069; G08G 5/045

(Continued)

(56) References Cited

U.S. PATENT DOCUMENTS 7,675,461 B1 * 3/2010 McCusker ................ G01S 7/20
340/963
7,826,971 B2  11/2010 Fontaine et al.
(Continued)

FOREIGN PATENT DOCUMENTS

CN   102163060 B   5/2013
CN   108153324 A   6/2018
(Continued)

*Primary Examiner* — Isaac G Smith
(74) *Attorney, Agent, or Firm* — Alston & Bird LLP

(57) ABSTRACT

Disclosed are methods, systems, and non-transitory computer-readable media for transmitting obstacle information to one or more operator displays associated with an aircraft. For instance, the method may include obtaining aircraft flight information including a current position and altitude; retrieving obstacle information for a flight area; scanning the flight area with environment sensors to identify observed obstacles and generate observed obstacle information. The method may further include aggregating the obstacle information with the observed obstacle information of the observed obstacles identified by the environment sensors to generate aggregated obstacle information identifying obstacles in the flight area; determining obstacle characteristics of the obstacles located in the flight area; assigning visual characteristics to each of the obstacles based at least in part on the determined obstacle characteristics; determining a subset of the obstacles relevant to the aircraft; and transmitting information on the relevant subset of obstacles to a display of the aircraft.

20 Claims, 6 Drawing Sheets

(58) Field of Classification Search
USPC .......................................................... 701/301
See application file for complete search history.

(56) References Cited

U.S. PATENT DOCUMENTS

| | | | |
|---|---|---|---|
| 8,487,787 | B2 | 7/2013 | Best et al. |
| 8,537,034 | B2 | 9/2013 | Greene et al. |
| 9,091,762 | B2 | 7/2015 | Knight |
| 9,472,109 | B2 | 10/2016 | Starr et al. |
| 9,997,078 | B2 | 6/2018 | Gadgil et al. |
| 10,089,894 | B1 * | 10/2018 | Chandrashekarappa .................... G01C 23/00 |
| 10,137,890 | B2 | 11/2018 | Sakai et al. |
| 10,431,105 | B2 | 10/2019 | Mannon et al. |
| 2010/0060511 | A1 | 3/2010 | Nouvel et al. |
| 2016/0379499 | A1 * | 12/2016 | Balasubramanian .. G08G 5/065 701/300 |
| 2017/0309060 | A1 | 10/2017 | John |
| 2018/0233052 | A1 | 8/2018 | Shamasundar et al. |
| 2020/0094984 | A1 * | 3/2020 | Cazaux .................. G06T 11/00 |

FOREIGN PATENT DOCUMENTS

| | | |
|---|---|---|
| CN | 110019268 A | 7/2019 |
| CN | 1100019268 A | 7/2019 |
| CN | 112017481 A | 12/2020 |
| EP | 2148176 B1 | 7/2009 |
| EP | 2835795 B1 | 7/2014 |

\* cited by examiner

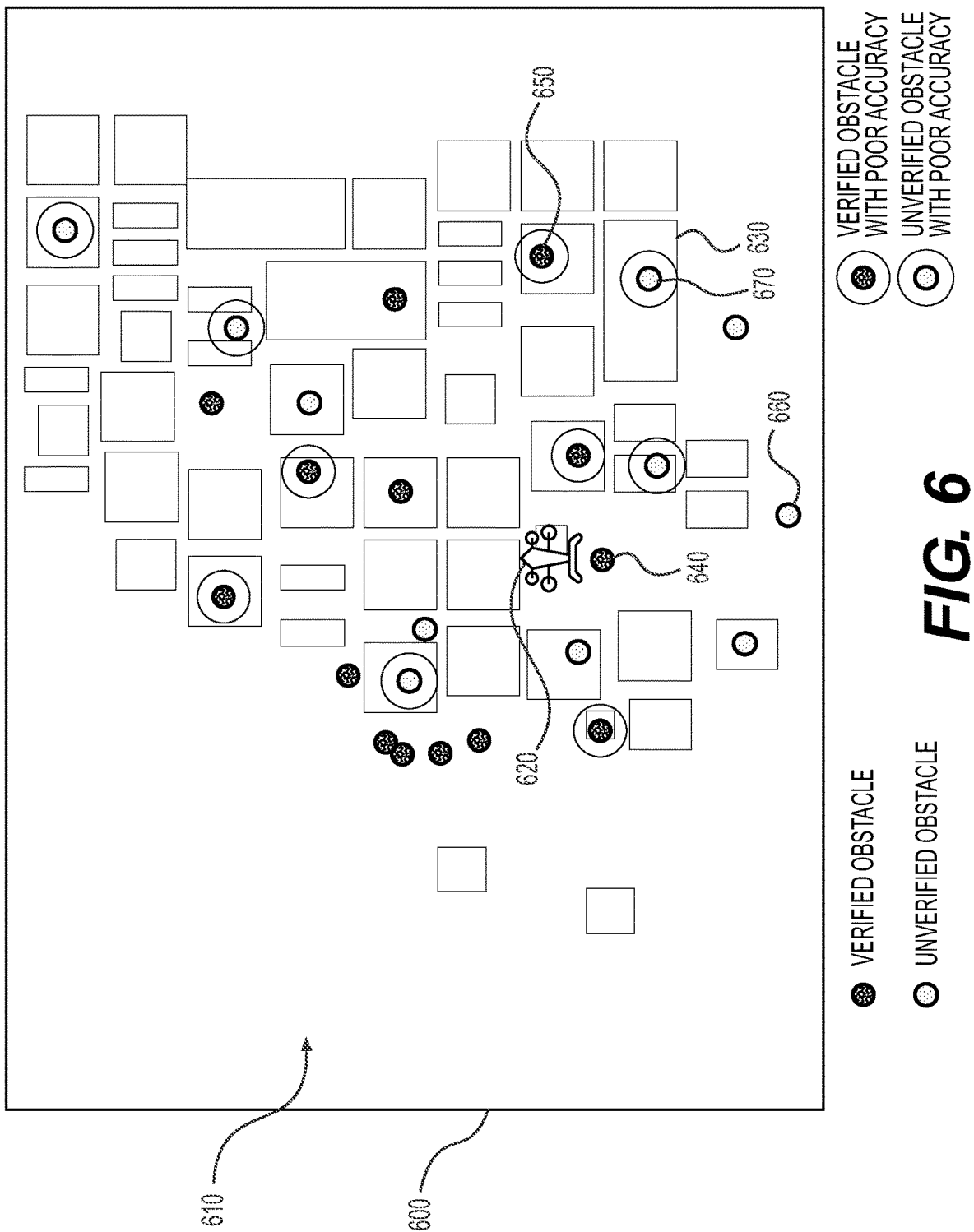

SYSTEMS AND METHODS FOR PROVIDING OBSTACLE INFORMATION TO AIRCRAFT OPERATOR DISPLAYS

CROSS-REFERENCE TO RELATED APPLICATIONS

This application claims the benefit of priority under 35 U.S.C. § 119 from Indian Patent Application No. 202111034896, filed on Aug. 3, 2021, the contents of which are incorporated by reference in their entirety.

TECHNICAL FIELD

Various embodiments of the present disclosure relate generally to the field of navigation for urban air mobility vehicles and, more particularly, to systems and methods for providing obstacle information to aircraft operator displays.

BACKGROUND

Urban air mobility (UAM) vehicles are often used to navigate at low altitudes in regions with features such as tall buildings and structures, including some buildings on which the UAM vehicle may land. While navigating such airspaces at lower altitudes, traditional obstacle notification systems may not provide the vehicle operator with relevant and accurate information regarding obstacles in the airspace. Databases exist that include some obstacle data, but there may be multiple data sources with a mix of verified and unverified obstacle information as well as obstacles of varying accuracy.

The present disclosure is directed to overcoming one or more of these above-referenced challenges.

SUMMARY OF THE DISCLOSURE

According to certain aspects of the disclosure, systems and methods are disclosed for providing obstacle information to aircraft operator displays.

For instance, a method for transmitting obstacle information to one or more operator displays associated with aircraft may include obtaining aircraft flight information including a current position and a current altitude of the aircraft; retrieving, from a database, obstacle information for a flight area, the flight area including the current position of the aircraft; scanning the flight area with one or more environment sensors to identify one or more observed obstacles and generate observed obstacle information. The method may further include aggregating the obstacle information retrieved from the database with the observed obstacle information of the one or more observed obstacles identified by the one or more environment sensors to generate aggregated obstacle information identifying one or more obstacles in the flight area; determining one or more obstacle characteristics of one or more obstacles located in the flight area; assigning one or more visual characteristics to each of the one or more obstacles located in the flight area based at least in part on the one or more determined obstacle characteristics; determining, based on the current position and the current altitude of the aircraft, a subset of the one or more obstacles that are relevant to the aircraft; and transmitting information on the determined relevant subset of the obstacles to a display of the aircraft for display to the one or more operators of the aircraft.

Moreover, a system according to the present disclosure may include a display including one or more screens, a memory storing instructions, and a processor executing the instructions to perform a process for transmitting obstacle information to one or more operator displays associated with aircraft. The process may include obtaining aircraft flight information including a current position and a current altitude of the aircraft; retrieving, from a database, obstacle information for a flight area, the flight area including the current position of the aircraft; scanning the flight area with one or more environment sensors to identify one or more observed obstacles and generate observed obstacle information. The process may further include aggregating the obstacle information retrieved from the database with the observed obstacle information of the one or more observed obstacles identified by the one or more environment sensors to generate aggregated obstacle information identifying one or more obstacles in the flight area; determining one or more obstacle characteristics of one or more obstacles located in the flight area; assigning one or more visual characteristics to each of the one or more obstacles located in the flight area based at least in part on the one or more determined obstacle characteristics; determining, based on the current position and the current altitude of the aircraft, a subset of the one or more obstacles that are relevant to the aircraft; and transmitting information on the determined relevant subset of the obstacles to a display of the aircraft for display to the one or more operators of the aircraft.

Moreover, according to the present disclosure, a non-transitory computer-readable medium may store instructions that, when executed by a processor, cause the processor to perform a method for transmitting obstacle information to one or more operator displays associated with aircraft. The method performed may include obtaining aircraft flight information including a current position and a current altitude of the aircraft; retrieving, from a database, obstacle information for a flight area, the flight area including the current position of the aircraft; scanning the flight area with one or more environment sensors to identify one or more observed obstacles and generate observed obstacle information. The method may further include aggregating the obstacle information retrieved from the database with the observed obstacle information of the one or more observed obstacles identified by the one or more environment sensors to generate aggregated obstacle information identifying one or more obstacles in the flight area; determining one or more obstacle characteristics of one or more obstacles located in the flight area; assigning one or more visual characteristics to each of the one or more obstacles located in the flight area based at least in part on the one or more determined obstacle characteristics; determining, based on the current position and the current altitude of the aircraft, a subset of the one or more obstacles that are relevant to the aircraft; and transmitting information on the determined relevant subset of the obstacles to a display of the aircraft for display to the one or more operators of the aircraft.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 6 depicts an exemplary graphical user interface including obstacles having different accuracy, according to one or more embodiments.

DETAILED DESCRIPTION OF EMBODIMENTS

Various embodiments of the present disclosure relate generally to the field of navigation for urban air mobility vehicles and, more particularly, to systems and methods for providing obstacle information to aircraft operator displays.

The present disclosure is directed to overcoming one or more of the challenges discussed above. As UAM vehicles generally operate at lower altitudes than other traditional aircraft, the presence of buildings and other structures in the airspace is relevant to aircraft operators. Accordingly, aircraft may be fitted with a number of displays and navigation aids to provide the operators with information, for example, the positions and heights of buildings in the airspace. When operating the aircraft, the operators may desire certain information and/or interface views during certain flight situations, for example, the location, altitude, verification status, and positional accuracy of various obstacles.

In general, the present disclosure is directed to systems and methods that are able to address one or more of the above challenges by providing obstacle information to aircraft operator displays to keep them fully apprised of the airspace and able to view relevant information about potential obstacles in an airspace. For instance, a system may provide the operator of a vehicle with up-to-date visual representations of obstacles that have been identified through any number of means, including databases and/or sensor arrays. The systems and/or methods of the present disclosure for providing obstacle information to aircraft operator displays may have an advantage of increasing the accuracy of the obstacle information provided to the vehicle operator, thereby allowing the operator to demonstrate an increased awareness of obstacles in the airspace.

Therefore, by providing obstacle information to aircraft operator displays, operators may be able to be aware of information most relevant to the flight situation, while not being surprised and/or provided with information that is not accurate or relevant to the surrounding airspace.

While this disclosure describes the systems and methods with reference to aircraft, it should be appreciated that the present systems and methods may be applicable to various other vehicles, including those of drones, automobiles, ships, spacecraft, or any other manned, unmanned, autonomous, and/or internet-connected vehicles, including vehicles operated or supervised by a pilot seated at a remote ground station.

Figure 1:
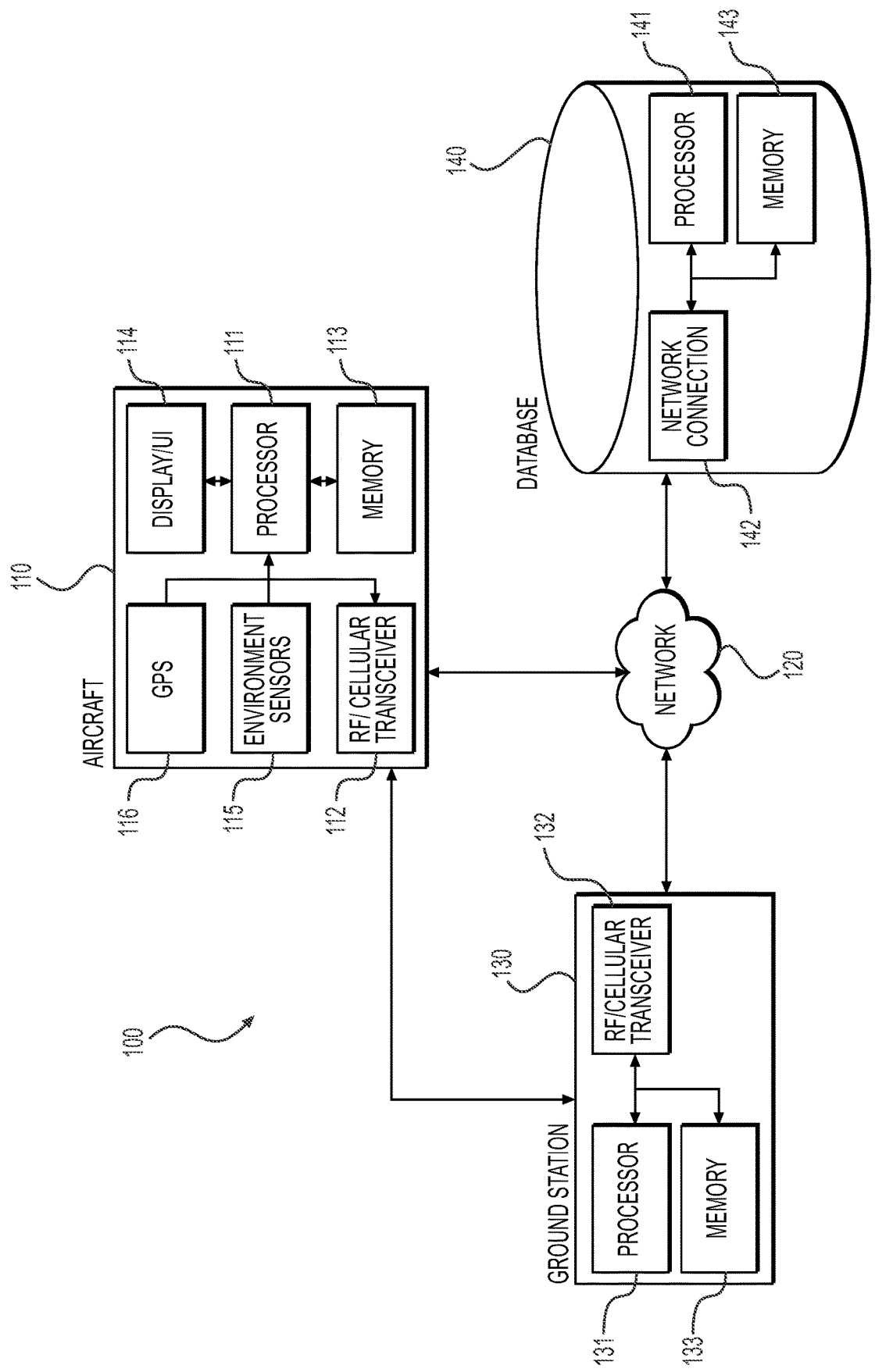
FIG. 1 depicts an exemplary system environment in which methods, systems, and other aspects of the present disclosure may be implemented.

FIG. 1 depicts an example of a system environment 100 in which systems, methods, and other aspects of the present disclosure may be implemented. The system environment 100 of FIG. 1 may include an aircraft 110, a network 120, one or more ground stations 130, and a database 140. Aircraft 110 may include processor 111 in communication with a plurality of other components such as RF/cellular transceiver 112, memory 113, display/user interface (UI) 114, environment sensors 115, and GPS 116. Processor 111 may include one or more processors that comprise the computing and flight management systems of aircraft 110. Memory 113 may be one or more components configured to store data related to aircraft 110, including instructions for operating flight components and aircraft systems (e.g., autopilot, route planning, communication). Processor 111 and memory 113 may display information to, and receive inputs from an operator of aircraft 110 via display/UI 114. Display/UI 114 may be of any suitable type, such as one or more monitors, touchscreen panels, heads-up displays, and may include operator input devices such as joysticks, buttons, touch-responsive panels, mice, trackpads, voice recognition devices, and the like.

In some embodiments, processor 111 may communicate with GPS 118 in order to, for example, locate aircraft 110 in the airspace, and communicate with environment sensors 115 to, for example, sense obstacles and conditions in and around aircraft 110 as it traverses the airspace. Without deviating from the scope of this disclosure, aircraft 110 may have additional elements that can be in communication with processor 111.

Aircraft 110 may use RF/cellular transceiver 112 to communicate with other elements of the system environment, for example, via network 120 or directly by radio communication. Network 120 may be implemented as, for example, the internet, a wireless network, Bluetooth, Near Field Communication (NFC), or any other type of network or combination of networks that provides communications between one or more components of the system environment 100. In some embodiments, the network 120 may be implemented using a suitable communication protocol or combination of protocols such as a wired or wireless internet connection in combination with a cellular data network.

To aid and/or guide aircraft 110, one or more ground stations 130 may provide aircraft 110 with information, such as information regarding air traffic, weather conditions, obstacles, and/or other information useful for the flight of aircraft 110. A ground station 130 may include a processor 131, an RF/cellular transceiver 132, and a memory 133. Processor 131 and memory 133 may collect and transmit information via RF/cellular transceiver 132. Ground station 130 may be in communication with, for example, air traffic control, meteorologists, and/or one or more databases 140.

One or more databases 140 may be repositories for system information such as map data, building data, flight plan data, and the like. Database 140 may include a processor 141, a network connection 142, and a memory 143. Memory 143 may store data, processor 141 may access and organize the stored data to respond to requests and provide updates to the stored data, and information may be provided to other elements in system environment 100 via network connection 142. In some embodiments, database 140 may communicate directly with aircraft 110 via network 120. Further, ground station 130 may be configured to relay requests for information from aircraft 110 to database 140 via its RF/cellular transceiver 132 or other network connection.

Figure 2:
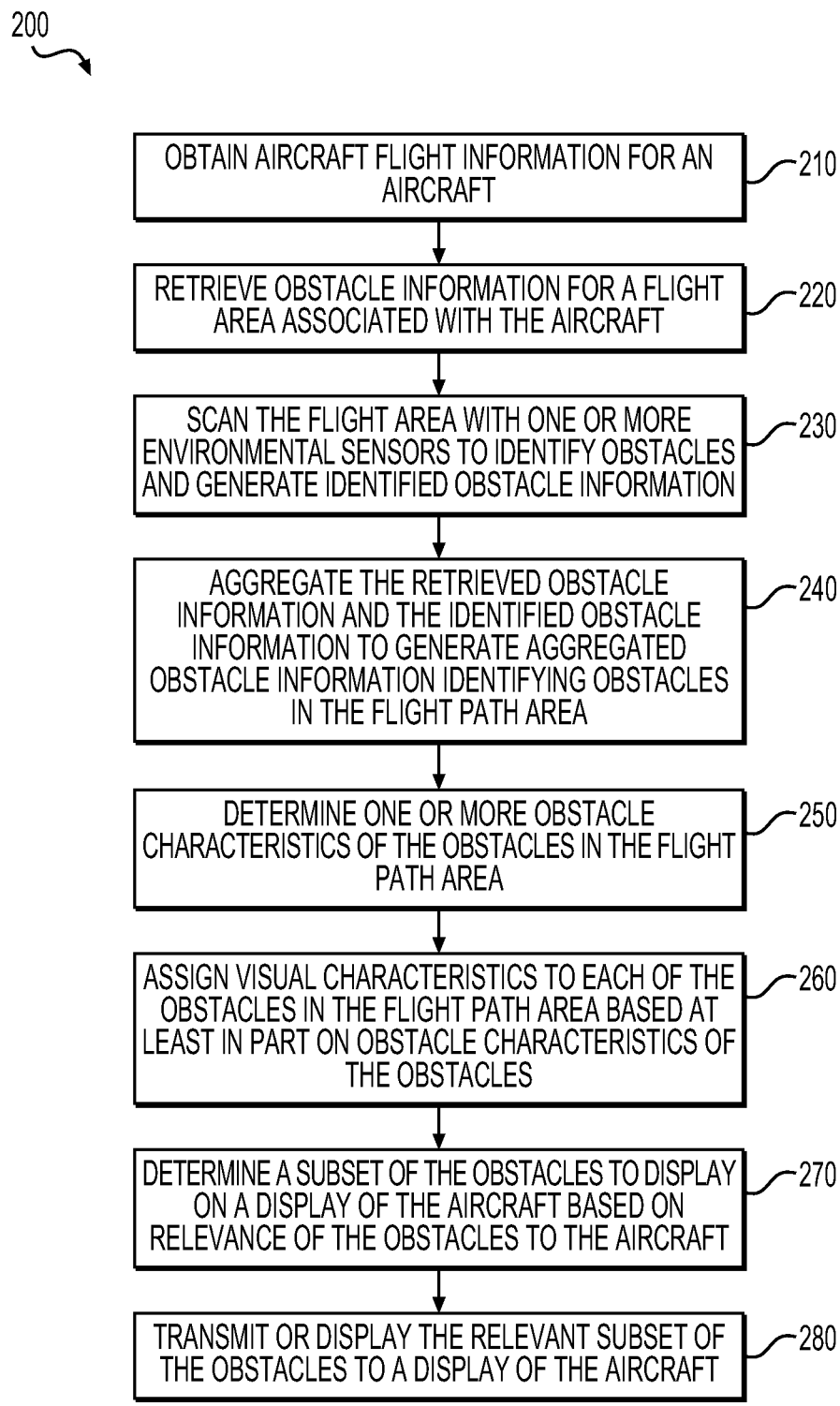
FIG. 2 depicts a flowchart for an exemplary process for providing contextual three-dimensional imagery to aircraft operators, according to one or more embodiments.

FIG. 2 illustrates an exemplary method 200 for providing obstacle information to aircraft operator displays in accordance with embodiments of the present disclosure. It should be understood that the steps described herein, and the sequence in which they are presented, are merely illustrative such that additional and/or fewer steps may be included without departing from the scope of the present disclosure.

Beginning at step 210, processor 111 may obtain aircraft flight information, for example from GPS 116. Aircraft flight information may include one or more of a current position, a current altitude, a current trajectory, local terrain elevation, and/or a destination. The aircraft flight information may also establish parameters regarding what portion of map/obstacle data should be displayed, and/or may aid in the determination of relevance for obstacles in the airspace.

Having obtained the aircraft flight information, at step 220, the system may then retrieve obstacle information for an area around the flight path and aircraft 110. This retrieved obstacle information can include, for example, map data, information regarding the dimensions and positions of one or more obstacles, and/or other information that may be relevant to an aircraft that is or will be in the vicinity of one or more obstacles. The obstacle information may be retrieved from one or more databases 140, for example, an obstacle database maintained by an organization such as the FAA. Obstacle information may also be received from other aircraft in the airspace, concurrently and/or at a previous time.

At step 230, aircraft 110 may employ one or more environment sensors 115 to scan a flight area surrounding aircraft 110 to identify obstacles and generate identified obstacle information. Environment sensors 115 may include one or more of radar, lidar, sonar, infrared, a visual camera, a thermal camera, and/or other sensors suitable for gathering information about objects or conditions in an airspace. The scan may be conducted on an ongoing basis, at certain altitudes or locations, and/or at time intervals to capture data regarding observed obstacles in the vicinity of aircraft 110.

Having collected information regarding obstacles from available sources, at step 240, processor 111 may aggregate the aircraft flight information, the obstacle information, and identified obstacle information to generate a single body of aggregated obstacle information that identifies obstacles in the flight path area. Because the data may, for example, be in different formats, have different degrees of verification and/or accuracy, and/or be from different times, combining the data into a single body of aggregated obstacle information may involve processor 111 and/or memory 113, or may be performed at least in part by ground station 130 and/or as a function of a database 140.

Figure 3B:
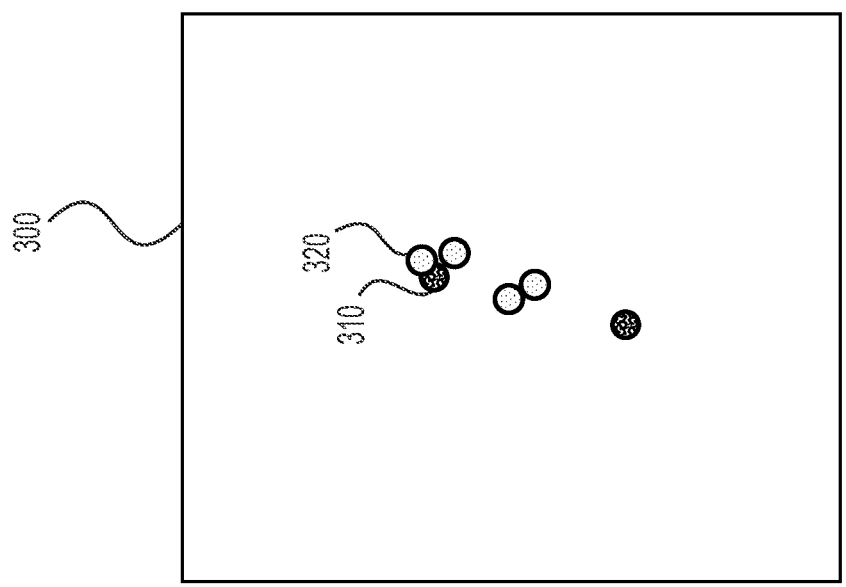
FIGS. 3A and 3B depict exemplary obstacle information before and after duplicates have been merged, respectively, according to one or more embodiments.
Figure 3A:
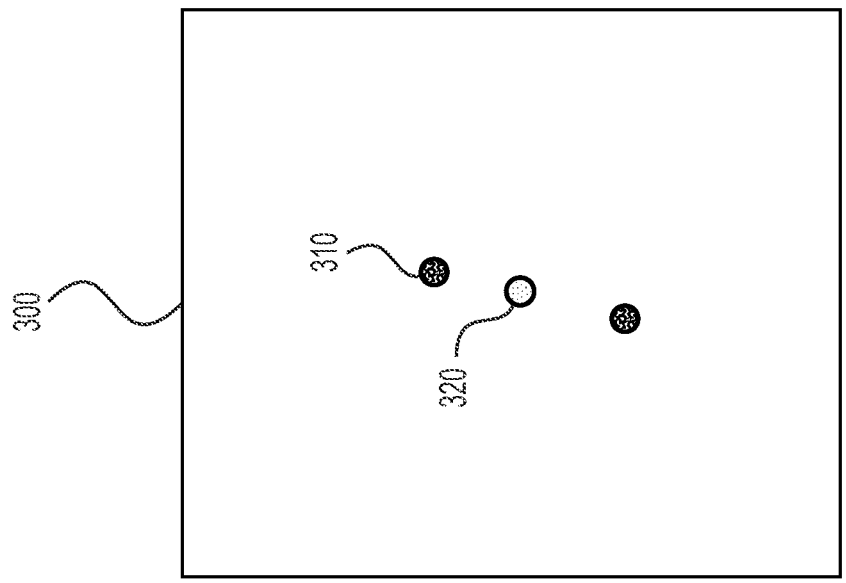

As illustrated in FIG. 3A, the plurality of sources of information regarding obstacles in airspace 300 may include duplicates and/or near duplicates. For example, in some embodiments, verified obstacles 310 may be included in the available aggregated obstacle information as adjacent to one or more unverified obstacles 320. FIG. 3B illustrates an exemplary merged obstacle view after the information of FIG. 3A has been analyzed and de-duplicated. Were the processor to include each of the individual obstacles on the display/UI 114, the operator(s) of aircraft 110 may be confused as to the number and position of the obstacles 310, 320. While aggregating the aircraft flight information, the obstacle information, and identified obstacle information, processor 111 may determine that obstacles from different sources may be fused or merged if certain criteria indicate that they are referring to the same obstacle in airspace 300. For example, processor 111 may verify that the plurality of obstacles are within a defined threshold of height, size, and/or position prior to merging them in the single body of aggregated obstacle information. Processor 111 may use such methods as are suitable to ensure that the operators of the aircraft are presented with accurate and non-redundant obstacle information.

Once compiled, the aggregated obstacle information may, at step 250, be used to determine one or more characteristics of the obstacles that have been located in the flight path area. These characteristics may include the size, altitude, verified status, accuracy of position, and/or other characteristics relevant to the navigation of the airspace around the obstacle. After the obstacle characteristics have been identified, at step 260, the characteristics may be used to assign visual characteristics to each of the obstacles located in the flight path area. For example, this may include assigning one or more visual characteristics to the obstacles. These visual characteristics assigned to each obstacle may include such variations as, for example, color, size, opacity, texture, symbology, luminescence, and/or visual effects such as blinking or flashing. In some embodiments, the operator of aircraft 110 may be able to determine their own set of visual characteristics based on a preference, such as the use of a preferred color or the avoidance of colors that the operator may not be able to distinguish (e.g., an operator with red-green color blindness). Aircraft operators can be aware of the assignment criteria, and therefore may be able to determine, based on the visual characteristic applied, that an obstacle in the airspace is, for example, verified or unverified or within an altitude range of aircraft 110, and/or determine whether an obstacle should be treated as having a high or poor accuracy, for example.

Once processor 111 has determined which visual characteristics should be assigned to an obstacle, at step 270, processor 111 may determine a relevant subset of the obstacles to display to the operator of aircraft 110. This determination may include an analysis of the relevance of the obstacles to aircraft 110. For example, obstacles that are too far away, or at an altitude significantly above or below the path of aircraft 110 may be deemed less relevant and may be removed from the set of obstacles to be displayed to the operators.

At step 280, the subset of relevant obstacles may be transmitted to or displayed on, for example, display/UI 114 so that the operators of the aircraft can observe the obstacles on a representation of the airspace around aircraft 110. The obstacles may be displayed via one or more graphical user interfaces (GUIs) that can be controlled and/or transmitted by processor 111. In some embodiments, the operators of aircraft 110 may be able to configure the GUIs displayed on display/UI 114 in order to provide the appropriate level of detail to navigate the airspace. It should be appreciated that display/UI 114 may additionally or alternatively be positioned at an off-board ground station for viewing by a remote operator/pilot, supervisor, or regulator.

Figure 4:
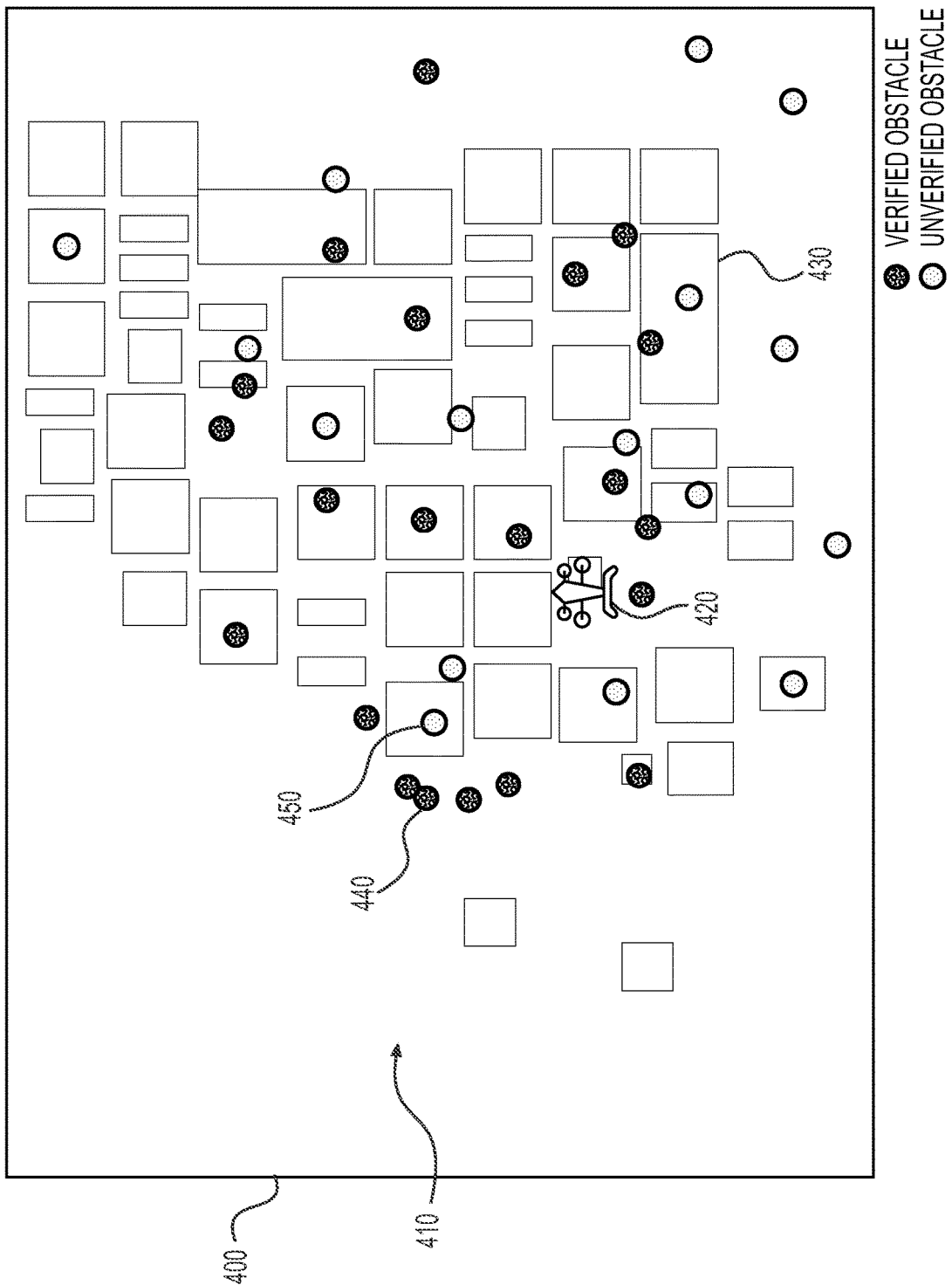
FIG. 4 depicts, an exemplary graphical user interface including verified and unverified obstacles according to one or more embodiments.

For example, FIG. 4 illustrates an exemplary GUI 400 that may be displayed on display/UI 114. GUI 400 can depict airspace 410, aircraft 420, and buildings/structures 430. In some embodiments, processor 111 associated with GUI 400 may generate and display obstacles having different visual characteristics for verified obstacles 440 and unverified obstacles 450. These different visual characteristics may include one or more of color, shading, size, shape, and/or other visually distinguishable features.

Figure 5:
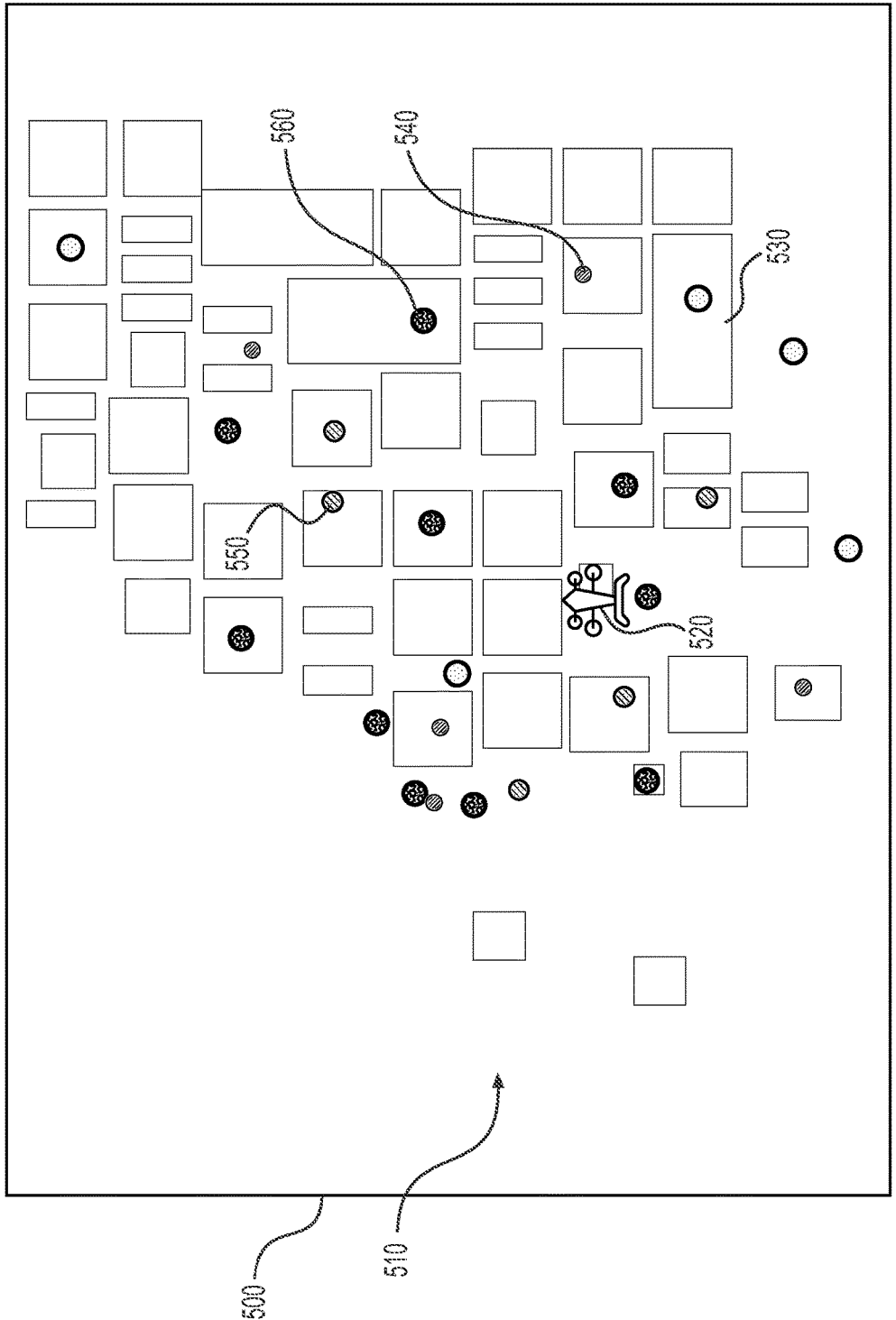
FIG. 5 depicts an exemplary graphical user interface including obstacles of different altitudes with respect to the aircraft, according to one or more embodiments.

In some embodiments, as illustrated in FIG. 5, display/UI 114 may display GUI 500, including airspace 510, aircraft 520, and buildings/structures 530. Processor 111 associated with GUI 500 is configured to generate and transmit to GUI 500 distinct visual characteristics to represent obstacles 540 within a certain predetermined distance (e.g., 200 ft.) of the altitude of aircraft 520, obstacles 550 outside of the certain distance of the altitude of aircraft 520 but within a larger predetermined distance (e.g., 400 ft.), and obstacles 560 outside the larger distance. For example, obstacles 540 may be particularly relevant for navigating airspace 510 and, as such, may be displayed with a specific visual characteristic, such as being fully opaque. Obstacles 550, for example, may be less relevant for navigating airspace 510 and, as such, may be displayed with a different visual characteristic from that assigned to obstacles 540, such as being partially transparent. Obstacles 560 may be of little to no relevance to the navigation of airspace 510 and, as such, may be displayed with yet another visual characteristic, and in some embodiments, may not be displayed at all. GUI 500 may allow an operator of aircraft 520 to quickly and effectively distinguish obstacles that should be completely avoided, as opposed to those that can be navigated over or around, or ignored entirely due to their being too far away to impact aircraft 520.

In some embodiments, as illustrated in FIG. 6, display/UI 114 may display GUI 600, including airspace 610, aircraft 620, and buildings/structures 630. Because some obstacles may be located or identified with varying degrees of accuracy, processor 111 associated with GUI 600 may be configured to generate and transmit to GUI 600 distinct visual characteristics to represent verified obstacles 640, verified obstacles with poor accuracy 650, unverified obstacles 660, and unverified obstacles with poor accuracy 670. Operators of aircraft 620 may navigate airspace 610 by giving a wider berth to low or poor accuracy obstacles, as they may include, for example, obstacles that move with the wind or obstacles with imprecise location data.

In some embodiments, there may be additional information available in a database or from the environment sensors 115 for some or all of the obstacles. For example, a database may include the type of marking and/or the type of lighting for a particular obstacle. This information may be useful for the operators of the aircraft as they navigate an airspace. Particularly in situations where visibility may be limited, being able to quickly determine that an obstacle seen by the operator corresponds to an obstacle identified on display/UI 114 may provide additional awareness for safely navigating an airspace.

Systems and methods for providing obstacle information to aircraft operator displays in accordance with the present disclosure may be able to provide an aircraft operator with relevant and accurate obstacle information present in the airspace about the aircraft (and/or the aircraft's path) in a visual manner. Displaying this obstacle imagery that visually represents characteristics that may be relevant to the aircraft's flight may reduce or eliminate the need for an aircraft operator to manually monitor extra displays or consult separate lists of obstacle information to receive relevant information. By automatically aggregating and providing information regarding obstacles in the airspace, and by reducing the amount of effort an aircraft operator may have to employ to otherwise identify and avoid obstacles, aircraft operators may exhibit an increased awareness of how the aircraft may safely proceed through the airspace at any given time.

The general discussion of this disclosure provides a brief, general description of a suitable computing environment in which the present disclosure may be implemented. In one embodiment, any of the disclosed systems and/or methods may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of +10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the embodiments disclosed herein. It is intended that the specification and examples be considered as exemplary only, with a true scope and spirit of the present disclosure being indicated by the following claims.

What is claimed is:

1. A method of transmitting obstacle information to one or more operator displays associated with an aircraft comprising:
    obtaining aircraft flight information including a current position and a current altitude of the aircraft;
    retrieving, from a database, obstacle information for a flight area, the flight area including the current position of the aircraft;
    scanning the flight area with one or more environment sensors to identify one or more observed obstacles and generate observed obstacle information;
    aggregating the obstacle information retrieved from the database with the observed obstacle information of the one or more observed obstacles identified by the one or more environment sensors to generate aggregated obstacle information identifying one or more obstacles in the flight area;
    determining one or more obstacle characteristics of the one or more obstacles located in the flight area;
    assigning one or more visual characteristics to each of the one or more obstacles located in the flight area based at least in part on the one or more determined obstacle characteristics;
    determining, based on the current position and the current altitude of the aircraft, a subset of the one or more obstacles that are relevant to the aircraft;
    rendering, for display at a graphical user interface accessible to the operator of the aircraft, a representation of at least a portion of the flight area, including the determined relevant subset of the obstacles and the respective one or more visual characteristics assigned to each of the determined relevant subset of the obstacles;
    transmitting information on the determined relevant subset of the obstacles to a display accessible to the operator of the aircraft for display at the graphical user interface; and
    displaying, at the graphical user interface, the rendered representation of the at least a portion of the flight area such that, upon being displayed at the interface, each of a first portion of the determined relevant subset of the obstacles is depicted at the graphical user interface as having a first visually perceivable feature corresponding to a first visual characteristic respectively assigned thereto and each of a second portion of the determined relevant subset of the obstacles is depicted at the graphical user interface as having a second visually perceivable feature corresponding to a second visual characteristic respectively assigned thereto.

2. The method of claim 1, wherein the obstacle information retrieved from the database includes a position and a height for one or more obstacles.

3. The method of claim 2, wherein the obstacle information further comprises a verification status.

4. The method of claim 1, wherein one or more environment sensors comprise one or more of radar, lidar, sonar, infrared, visual camera, and thermal camera.

5. The method of claim 1, wherein aggregating the obstacle information retrieved from the database with the one or more observed obstacles identified by the one or more environment sensors further includes:
    determining whether or not multiple of the one or more obstacles are within a first defined threshold of relative position and a second defined threshold of height, wherein the relative position is defined relative to the current position of the aircraft; and
    merging obstacles that have been determined to be within the first defined threshold of location and the second defined threshold of height into a single verified obstacle.

6. The method of claim 1, wherein assigning one or more visual characteristics to each of the one or more obstacles includes:
    assigning one of the one or more visual characteristics to the one or more obstacles based at least in part on whether or not the one or more obstacles are located within a predetermined distance of the aircraft; and
    assigning one of the one or more visual characteristics to the one or more obstacles based at least in part on whether or not the one or more obstacles is verified or unverified.

7. The method of claim 6, wherein the one or more obstacle characteristics include color, opacity, and size.

8. The method of claim 2, wherein determining one or more relevant obstacles to be displayed is based at least in part on the height of each of the one of more obstacles and the current altitude of the aircraft.

9. The method of claim 1, wherein the obstacle information retrieved from the database includes a type of marking and a type of lighting for one or more obstacles.

10. The method of claim 9, wherein assigning one or more visual characteristics to each of the one or more obstacles includes:
  assigning one of the one or more visual characteristics to the one or more obstacles based at least in part on the type of marking; and
  assigning one of the one or more visual characteristics to the one or more obstacles based at least in part on the type of lighting.

11. A system comprising:
  a display including one or more screens;
  a memory storing instructions; and
  a processor executing the instructions to perform a process for transmitting obstacle information to one or more operator displays associated with aircraft including:
    obtaining aircraft flight information including a current position and a current altitude of the aircraft;
    retrieving, from a database, obstacle information for a flight area, the flight area including the current position of the aircraft;
    scanning the flight area with one or more environment sensors to identify one or more observed obstacles and generate observed obstacle information;
    aggregating the obstacle information retrieved from the database with the observed obstacle information of the one or more observed obstacles identified by the one or more environment sensors to generate aggregated obstacle information identifying one or more obstacles in the flight area;
    determining one or more obstacle characteristics of the one or more obstacles located in the flight area;
    assigning one or more visual characteristics to each of the one or more obstacles located in the flight area based at least in part on the one or more determined obstacle characteristics;
    determining, based on the current position and the current altitude of the aircraft, a subset of the one or more obstacles that are relevant to the aircraft;
    rendering, for display at a graphical user interface accessible to the operator of the aircraft, a representation of at least a portion of the flight area, including the determined relevant subset of the obstacles and the respective one or more visual characteristics assigned to each of the determined relevant subset of the obstacles;
    transmitting information on the determined relevant subset of the obstacles to a display accessible to the operator of the aircraft for display at the graphical user interface; and
    displaying, at the graphical user interface, the rendered representation of the at least a portion of the flight area such that, upon being displayed at the interface, each of a first portion of the determined relevant subset of the obstacles is depicted at the graphical user interface as having a first visually perceivable feature corresponding to a first visual characteristic respectively assigned thereto and each of a second portion of the determined relevant subset of the obstacles is depicted at the graphical user interface as having a second visually perceivable feature corresponding to a second visual characteristic respectively assigned thereto.

12. The system of claim 11, wherein the obstacle information retrieved from the database includes a position and a height for one or more obstacles.

13. The system of claim 12, wherein the obstacle information further comprises a verification status.

14. The system of claim 11, wherein one or more environment sensors comprise one or more of radar, lidar, sonar, infrared, visual camera, and thermal camera.

15. The system of claim 11, wherein aggregating the obstacle information retrieved from the database with the one or more observed obstacles identified by the one or more environment sensors further includes:
  determining whether or not multiple of the one or more obstacles are within a first defined threshold of relative position and a second defined threshold of height, wherein the relative position is defined relative to the current position of the aircraft; and
  merging obstacles that have been determined to be within the first defined threshold of location and the second defined threshold of height into a single verified obstacle.

16. The system of claim 11, wherein assigning one or more visual characteristics to each of the one or more obstacles includes:
  assigning one of the one or more visual characteristics to the one or more obstacles based at least in part on whether or not the one or more obstacles are located within a predetermined distance of the aircraft; and
  assigning one of the one or more visual characteristics to the one or more obstacles based at least in part on whether or not the one or more obstacles is verified or unverified.

17. The system of claim 12, wherein determining one or more relevant obstacles to be displayed is based at least in part on the height of each of the one of more obstacles and the current altitude of the aircraft.

18. The system of claim 11, wherein the obstacle information retrieved from the database includes a type of marking and a type of lighting for one or more obstacles.

19. The system of claim 18, wherein assigning one or more visual characteristics to each of the one or more obstacles includes:
  assigning one of the one or more visual characteristics to the one or more obstacles based at least in part on the type of marking; and
  assigning one of the one or more visual characteristics to the one or more obstacles based at least in part on the type of lighting.

20. A non-transitory computer-readable medium storing instructions that, when executed by a processor, cause the processor to perform a method for transmitting obstacle information to one or more operator displays associated with aircraft, the method comprising:
  obtaining aircraft flight information including a current position and a current altitude of the aircraft;
  retrieving, from a database, obstacle information for a flight area, the flight area including the current position of the aircraft, wherein the obstacle information includes data associated with a static obstacle defined at least partially within the flight area;
  scanning the flight area with one or more environment sensors associated with the aircraft to identify one or more observed obstacles and generate observed obstacle information, wherein the observed obstacle information includes data associated with a dynamic obstacle sensed by the one or more environment sensors to be within the flight area;

aggregating the obstacle information retrieved from the database with the observed obstacle information of the one or more observed obstacles identified by the one or more environment sensors to generate aggregated obstacle information identifying one or more obstacles in the flight area;

determining one or more obstacle characteristics of one or more obstacles located in the flight area;

assigning one or more visual characteristics to each of the one or more obstacles located in the flight area based at least in part on the one or more determined obstacle characteristics;

determining, based on the current position and the current altitude of the aircraft, a subset of the one or more obstacles that are relevant to the aircraft;

rendering, for display at a graphical user interface accessible to the operator of the aircraft, a representation of at least a portion of the flight area, including the determined relevant subset of the obstacles and the respective one or more visual characteristics assigned to each of the determined relevant subset of the obstacles;

transmitting information on the determined relevant subset of the obstacles to a display accessible to the operator of the aircraft for display at the graphical user interface; and displaying, at the graphical user interface, the rendered representation of the at least a portion of the flight area such that, upon being displayed at the interface, each of a first portion of the determined relevant subset of the obstacles is depicted at the graphical user interface as having a first visually perceivable feature corresponding to a first visual characteristic respectively assigned thereto and each of a second portion of the determined relevant subset of the obstacles is depicted at the graphical user interface as having a second visually perceivable feature corresponding to a second visual characteristic respectively assigned thereto.

* * * * *